United States Patent [19]

Caputo

[11] 4,132,868
[45] Jan. 2, 1979

[54] PABX SYSTEM PROVIDING MULTIPLE PATHS HELD BETWEEN CALLING LINE CIRCUITS AND A PLURALITY OF OUTPUT CIRCUITS

[75] Inventor: James P. Caputo, Elmwood Park, Ill.

[73] Assignee: Entel Corporation, La Grage, Ill.

[21] Appl. No.: 786,205

[22] Filed: Apr. 11, 1977

[51] Int. Cl.$^2$ .............................. H04Q 3/42
[52] U.S. Cl. ................... 179/18 E; 179/18 BD; 179/18 DA; 179/18 GF
[58] Field of Search ........... 179/18 E, 18 EA, 18 GF, 179/18 AD, 18 DA, 18 BD, 18 B, 18 J

[56] References Cited

U.S. PATENT DOCUMENTS

| | | | |
|---|---|---|---|
| 3,482,052 | 12/1969 | Hestad et al. | 179/18 BD |
| 3,655,918 | 4/1972 | Marbury et al. | 179/18 GF |
| 3,671,677 | 6/1972 | Lee, Jr. et al. | 179/18 DA |
| 3,692,951 | 9/1972 | Hestad et al. | 179/27 CB |
| 3,865,978 | 2/1975 | Hestad | 179/18 GF |
| 3,865,979 | 2/1975 | Hestad | 179/18 GF |

FOREIGN PATENT DOCUMENTS 2219104 10/1973 Fed. Rep. of Germany ......... 179/18 B Primary Examiner—Thomas W. Brown
Attorney, Agent, or Firm—Alter and Weiss

[57] ABSTRACT

A unique private automatic branch exchange system wherein a plurality of paths from the calling line circuits are established through the switching matrix to more than one output circuit. The paths are held simultaneously. The ability for multiple simultaneous connections eliminates the necessity for many circuits such as toll restrictors, access circuits, and such other accessory circuits. This approach not only saves hardware but also allows more features to be incorporated into the system with more efficient use of the circuits.

15 Claims, 3 Drawing Figures

PABX SYSTEM PROVIDING MULTIPLE PATHS HELD BETWEEN CALLING LINE CIRCUITS AND A PLURALITY OF OUTPUT CIRCUITS

This invention relates to private automatic branch exchanges and, more particularly, to the circuitry used in setting up communication paths through such exchanges.

In the past, line circuits have typically been connected through switching matrices to one output type circuit at a time. Thus, for example, a line circuit going off hook marks one end of a switching matrix and causes a register to mark the other end of the matrix to establish a path from the line circuit to the register. The dialed digits or tone signals are transmitted to the register over that path. In the case of an outgoing call, the register drops from the line circuit and the line circuit is connected to a trunk through a new path in the matrix. The trunk calls in a toll restrictor which analyzes the number dialed to determine if it is restricted. If it is not restricted then the toll restrictor circuit releases and the outgoing call continues. If the number is restricted, then the toll restrictor circuit releases the calling line from the trunk. The connection of the restrictor to the trunk often requires access circuitry.

By maintaining the register circuit path to the line circuit and simultaneously connecting another path from a trunk circuit to the line circuit through the matrix then the toll restrictor circuit and associated access circuits can be eliminated. Thus, the presently available PABX systems require a multiplicity of different specialized circuits which have to be successively connected to effect a connection between the line circuits and either trunk circuits or other line circuits. This adds to the complexity of the circuitry required, lowers the reliability and does not use the interconnecting equipment with maximum efficiency.

Accordingly, it is an object of the present invention to provide new and unique PABX circuitry having means for establishing and holding multiple paths from output circuits to the line circuits through the matrices.

A related object of the present invention is to provide telephone circuitry wherein line circuits can be connected to a trunk while the register is held if toll restriction is required.

Another related object of the present invention is to provide PABX system features using a minimum of separate function circuits and access circuits.

Still another object of the present invention is to provide private automatic branch exchange systems wherein after a path is established through the switching matrix from a line circuit to a register then a trunk circuit is connected to the line circuit while the register is still connected through the matrix.

Yet another object of the present invention is to provide private automatic branch exchange circuitry where the number of circuits used to make the connection between a calling circuit and other communication lines are minimized.

In accordance with a preferred embodiment of the invention, a private branch exchange is provided that includes line circuits coupled through switching matrices to function circuitry such as registers, trunk circuits, and transfer circuits. A common control is provided for controlling the interconnection of the line circuit to desired registers, transfer circuits, trunk circuits, and to other line circuits.

When a line circuit goes off hook, the common control circuit enables the line circuit to seize an idle register through the switching matrix of the PABX. The digits dialed into the register are analyzed to determine if the call is restricted. For example, when the first digit dialed into the register requests a connection from the calling line circuit to a trunk circuit, the common control will enable the line circuit to connect to an idle trunk through the matrix. The register, however, remains connected to the line circuit to receive the digits or tones sent by the calling line and passes on the information to the common control circuit. When the number dialed is restricted, then the common control releases the trunk and a "busy" tone is provided by the register. In this preferred embodiment, the necessity of separate toll restrictor circuits is eliminated. In addition, in the case of a Touch-Tone signaling system, the associated Touch-Tone receivers required by the toll restrictor are eliminated.

A transfer call is another instance of the use of multiple connections to the line circuits through the switching matrices. After a path is set up between a PABX line circuit and a line circuit at a distant exchange through a trunk circuit at the PABX party's exchange, then by using the hook switch at at the PABX line circuit, the common control circuit is alerted and connects a transfer link circuit to the PABX line through a separate path in the matrix. The PABX line then dials the digits of the extension line to which the call is to be transferred. The transfer circuit receives the digits from the PABX transferor line. With the aid of the common control circuit, the extension is connected to the transfer circuit through the matrix responsive to the dialed digits. When the PABX transferor line goes on hook the common control then causes the transfer link to release and connects the transferee extension line to the trunk through the matrix. Thus, there is a period of time when when the original PABX line is connected to both the trunk circuit and the transfer circuit through the same switching matrix.

Accordingly, the special access circuitry provided in prior art systems between the trunks and transfer circuit is eliminated. The dual connection to the PABX transferor line through the matrix also makes more efficient use of the circuits used to transfer the call as the transfer links can be accessed by all trunks. Therefore, for example, fewer transfer circuits are required.

The above mentioned and other features and objects of this invention and the manner of obtaining them will become more apparent and the invention itself will be best understood by reference to the following description of preferred embodiments of the invention taken in conjunction with the accompanying drawings, in which.

Figure 1:
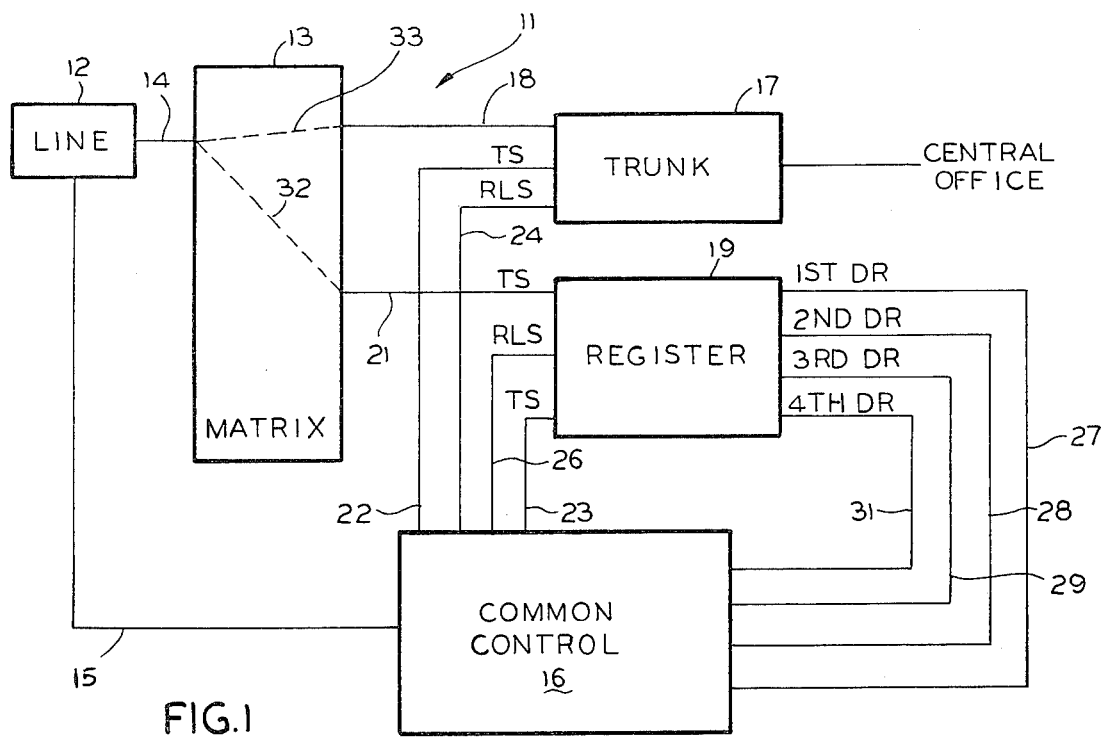
FIG. 1 is a block diagram showing a line circuit interconnected simultaneously to a trunk circuit and a register through a switching matrix.

Referring now to FIG. 1, therein is shown an exemplary multiple connection system wherein a line circuit 12 in a PABX system 11 is simultaneously connected through a switching matrix 13 to more than one matrix output circuit. The line circuit 12 is shown as having only one appearance through conductor 14 at the switching matrix 13.

It should be understood that a multiplicity of line circuits are connected to the switching matrix. However, for purposes of clarity, only one line circuit is shown herein.

The line circuit 12 is also connected to a common control circuit 16 through conductor 15. As is common practice in PABX systems, the output side of the matrix is connected through a trunk circuit 17 to a central office (not shown). The connection between the line circuit and the trunk circuit is completed through the switching matrix 13. As shown herein, the trunk circuit has only a single appearance through conductor 18 at the switching matrix.

For purposes of illustration, another output circuit is shown connected to the line circuit simultaneously with the trunk circuit. That is register circuit 19, which is shown having a single appearance at the switching matrix through conductor 21. A common control circuit 16, which performs such services as providing time slots for the function circuits and the line circuits is also shown. For example, the common control circuit 16 indicates to a register when a line circuit, such as line circuit 12, goes off hook, so that the register marks the matrix for connection to the line circuit through the matrix. The time slot signals from the common control circuit 16 to the trunk 17 and to register 19 are carried over conductors 22 and 23, respectively. The common control circuit 16 also provides release signals to the output circuits connected to the matrix which causes the release of those circuits. The release signals to trunk 17 and to register 19 are carried over conductors 24 and 26, respectively. The register 19 transmits signals to the common control circuit 16 through conductors such as conductors 27, 28, 29, and 31. This type of communication is common in telephony. The register sends first digit request signals, second digit request signals, third digit request signals, and fourth digit request signals to the common control circuit. Responsive to the receipt of these request signals, the common control circuit takes various actions necessary for controlling the progress of the call connection.

For example, when the line circuit 12 goes off hook, a signal is sent over conductor 15 to the common control circuit. The common control circuit then sends a signal to an available one of a plurality of registers in the proper time slot causing the register to mark the output side of the switching matrix during its time slot over conductor 21.

The line circuit is then connected through the switching matrix on path 32 to the register responsive to the marks applied by the line circuit and the register to opposite sides of the matrix. After the path 32 switches through, the dialed digits go directly into the register from the line circuit.

When the first digit dialed, for example, is for a trunk, the common control circuit is informed of this first digit by the first digit request signal going from the register 19 to the common control circuit 16 over conductor 27. When the first digit indicates the call is outgoing and, therefore, requires a trunk, the trunk is connected to the matrix and the register remains connected over path 32. No special access circuit or digit collector is used or required.

More particularly, the common control circuit 16 sends a signal to a trunk circuit 17 causing that trunk circuit to mark conductor 18 attached to the matrix. It also sends a signal to the line circuit which again marks conductor 14, thereby enabling a path 33 to be established through the matrix from the line circuit to the trunk circuit. If there is no restriction, the register is released and the rest of the digits coming from the line circuit are received at the central office through the trunk circuit.

Information and control signals also travel between the trunk circuit and the common control circuit. For example, when the number dialed indicates a restriction, then the common control sends a release signal over conductor 24 to the trunk causing the trunk to be released.

Thus, instead of releasing the register and connecting a toll restrictor to the trunk through an access circuit, the register performs the task of digit collection previously performed by the toll restrictor and its associated specialized circuits. Simultaneous connection of the line circuit to the plurality of output circuits through the switching matrix eliminates the function circuits, such as the toll restrictor circuit, the digit collector circuit, the specialized associated type tone receivers (in the case of a tone signaling system), and the access circuits previously required.

Figure 2:
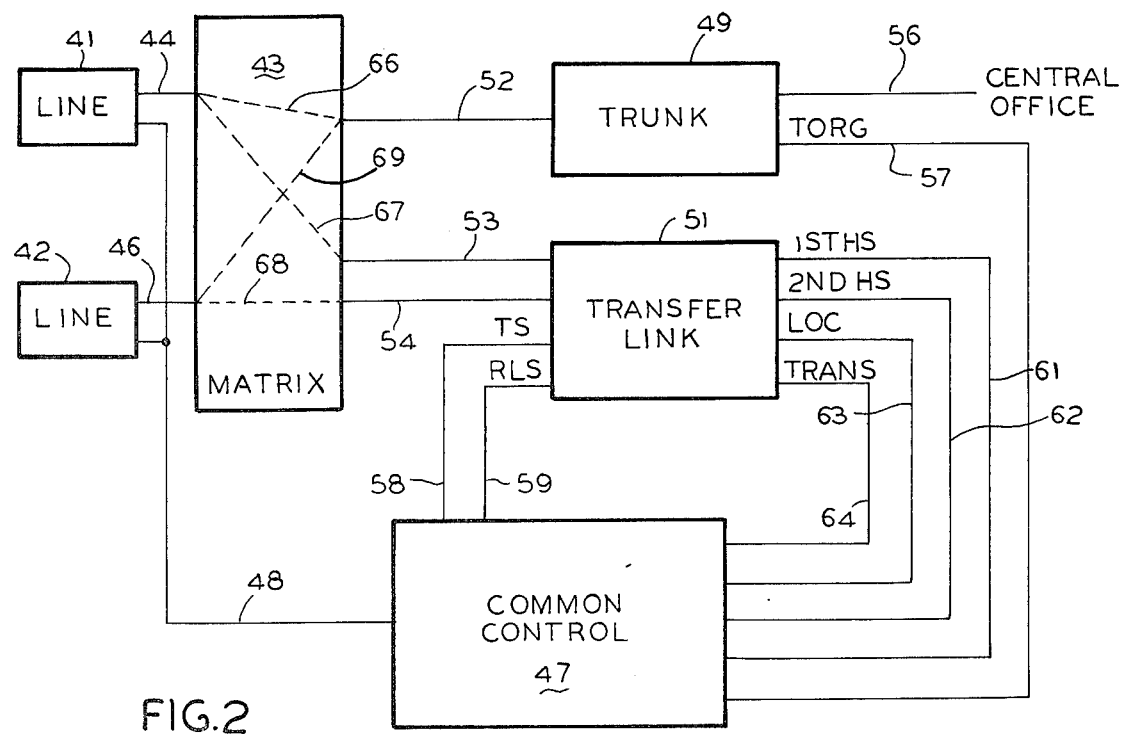
FIG. 2 is a block diagram showing a line circuit interconnected simultaneously to a trunk circuit and a transfer link through the switching matrix.

FIG. 2 is the block diagram of a PABX call transfer circuit wherein multiple connections from the line circuit through the matrix saves equipment and increases the reliability and efficiency of the telephone circuitry. In FIG. 2, the telephone circuit shown includes two of a plurality of line circuits 41 and 42. It is understood, here again, that there are more line circuits in the private automatic branch exchange; however, for purposes of avoiding unnecessarily complicating the drawings, only two line circuits, the original PABX line and the PABX line to which the call is transferred, are shown.

Each of the line circuits has the single appearance at switching matrix 43. For example, line circuit 41 is connected to the switching matrix through conductor 44; while line circuit 42 is coupled to the switching matrix through conductor 46. The line circuits are also shown coupled to common control circuitry 47 through conductor 48.

Typical telephone function circuits connected to the output side of the switching matrix are shown as the trunk circuit 49 and a transfer link 51. The trunk circuit is shown as having a single appearance at the switching matrix over conductor 52. The transfer link has a pair of appearances at the switching matrix. More particularly, conductor 53 is the first appearance of the transfer link 51 and conductor 54 represents the second appearance to the matrix of the transfer link 51. The trunk circuit is shown as having a conductor 56 connecting it to a central office and conductor 57 connecting it to the common control circuit 47.

The transfer link 51 is shown connected to the common control circuit 47 by the time slot conductor 58 and the release conductor 59. In addition, conductors 61, 62, 63, and 64 connect the transfer link 51 to the common control circuit 47. The conductors 61 and 62 are used, for example, for transferring first hook switch and second hook switch signals, received from line circuits 41 to the common control circuit 47. The conductor 63 is used for transferring a termination request signal to the common control circuit from the transfer link during the transfer link time slot. The conductor 64 is used, for example, for extending a transfer signal from the transfer link 51 to the common control circuit 47.

Responsive to that signal the common control transfers the call from the line circuit 41 to line circuit 42. The transfer link 51 is released and a new path is established directly from line circuit 42 to trunk 49.

In operation, a line circuit such as line circuit 41 is shown connected through a path 66 in the switching matrix, conductor 52, and trunk circuit 49 to a central office party. The operation of the hook switch at line circuit 41 is detected in the trunk and is carried by conductor 57 to the common control circuit 47. The common control circuit then extends a signal during the transfer link time slot over conductor 58 causing the transfer link to mark the output side of the matrix. The common control circuit also signals line circuit 41 to again mark conductor 44 to obtain access through the switching matrix, over a path 67, to transfer link 51. Thus, at this time, line 41 is connected to both trunk circuit 49 and transfer link 51.

Transfer link 51 receives the digits identifying line 42 which are transmitted by line circuit 41 indicating that the line circuit 42 should be connected to transfer link 51. To establish this connection, the common control circuit 47 sends a signal over conductor 48 enabling line circuit 42 to mark the conductor 46 at the input of switching matrix 43. The transfer link 51 marks the output of the matrix at its second appearance, with the consequent establishment of a path 68 through the matrix connecting the line circuit 42 to the transfer link 51.

The transfer link connects line circuit 41 to line circuit 42. The line circuit 41 is at this time connected to both trunk 49 and transfer link 51 through matrix 43 and through the transfer link 51 to line 42. Although the paths are established through the matrix and the transfer link at this time, the speech path through that trunk is open to enable the parties at lines 41 and 42 to converse privately.

In greater detail, an extension such as line circuit 41 is normally connected to a trunk circuit through switching matrix path such as path 66 and conductor 52. If the party at line circuit 41 wants to transfer the call to another extension, such as that connected to line 42, he then operates the hook switch. The trunk upon detecting the hook switch signals sends a trunk originate request signal over conductor 57 to the common control circuit 47 during the trunk time slot. Common control circuit 47 then causes the connection of line circuit 41 based on the identity stored in the trunk circuit memory to the transfer link 51 over path 67. This requires the transfer link to mark the matrix and line circuit 41 to re-mark the matrix. At the time of switch through of path 67 the line circuit 41 is connected to both the trunk 49 and the transfer link 51. The party at line circuit 41 then dials the number of the party to which he wants the call transferred. The digits or the tones are received by the transfer link over path 67. Of course, it should be understood in the case described herein that the identification dialed from line circuit 41 is restricted to a local number. The transfer thus can only be done between the line circuits or extensions connected to the matrix 43.

When all the digits are received by the transfer link, the transfer link sends an LOC signal, that is, a local termination request to the common control during the transfer link time slot. The common control then sets up the path 68 between line 42 and transfer link 51. When responsive to ringing, the party at line 42 goes off hook, lines 41 and 42 are interconnected for private conversation. The transfer link can then detect the hook switch flash from line circuit 41 as the first hook signal and transmits the first hook switch signal to the common control circuit on conductor 61. Responsive to a first hook switch signal, the common control during the next time slot of the transfer link sets up a conference call between the city party at the central office and the lines 41 and 42. If, however, the first party at line 41 goes on hook, then this signal is detected by the transfer link and it sends responsive thereto a transfer signal on the conductor 64 to the common control. The common control then sends a release signal to the transfer link and causes a path 69 to be established from the line 42 to the trunk directly through the matrix. At this time, paths 66, 67, and 68 are dropped, and the transfer link is released.

The arrangement shown in FIG. 2 eliminates the necessity of using special access circuitry between the trunk and transfer circuits and also results in a more efficient sharing of the transfer circuits by the trunks.

Figure 3:
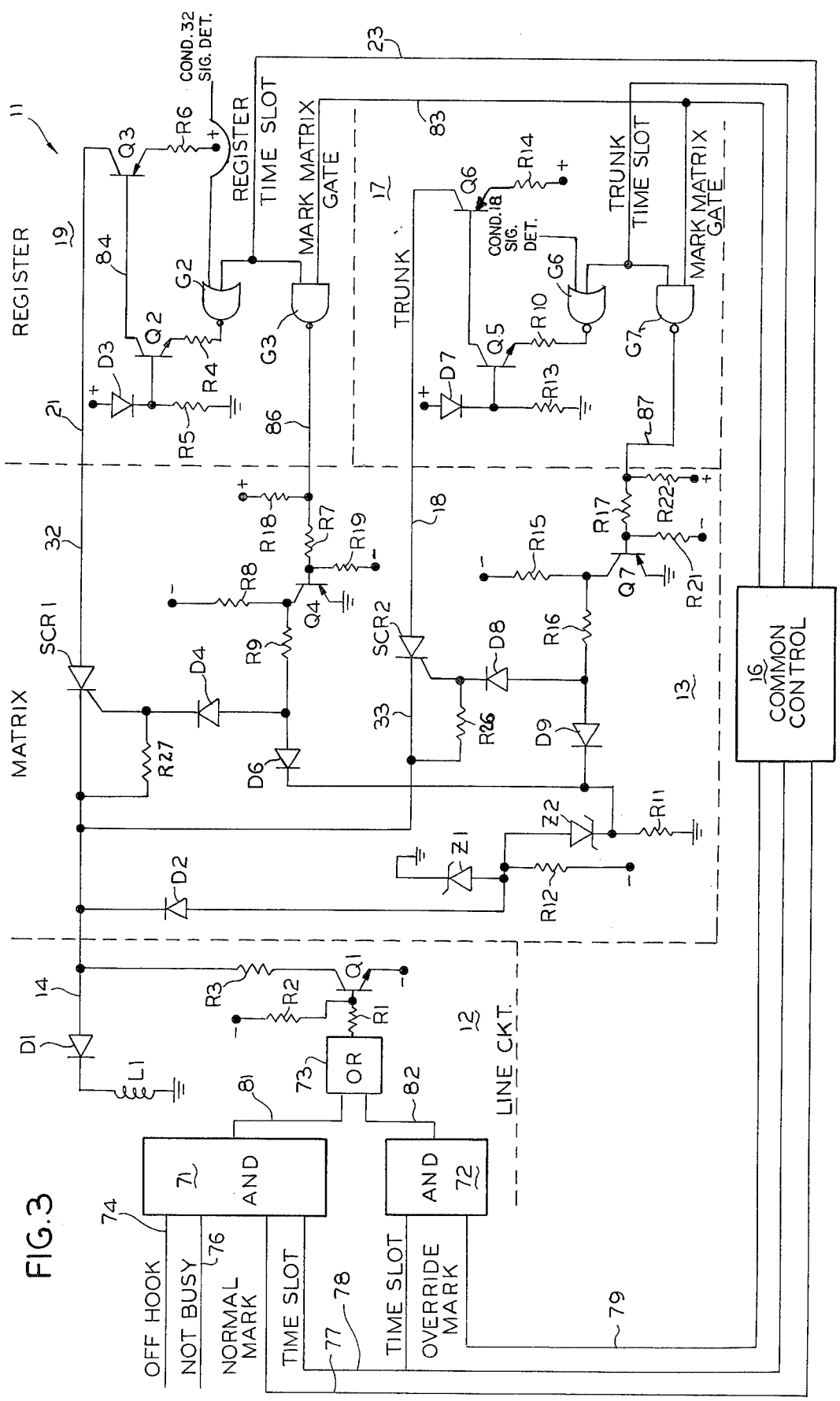
FIG. 3 is a schematic showing of the exemplary circuitry necessary in the dual connection of a line circuit through the switching matrix to a register and trunk, for example.

The schematic circuitry used in the arrangement shown in the block diagram of FIG. 1 is depicted in FIG. 3, by way of example. It should be understood, of course, that only the necessary parts of the line matrix, register, and trunk circuits are shown to complete an understanding of the invention described herein.

The line circuit 12 is shown to include an AND gate 71 and an AND gate 72. The output of those AND gates are fed through an OR gate 73 to operate a switching device such as NPN transistor Q1. The AND gate 71 is shown with four inputs. An "off-hook" input 74, a "not-busy" input 76, a normal mark input 77, and a time slot input 78. The "off-hood" and "not-busy" are conditions of the line. The normal mark and the time slot signals come from the common control circuit 16. The AND gate 72 receives two signals from the common control circuit 16. The first signal is the time slot signal received over conductor 78 and the second signal is an over-ride mark received over conductor 79. AND gate 71 is connected to OR gate 73 over conductor 81, while AND gate 72 is connected to OR gate 73 over conductor 82.

Thus, if there is a signal from either of the AND gates; then, the normally non-conducting transistor Q1 is turned on to mark the appearance of line 12 at matrix 13 over conductor 14. A diode D1 is shown coupling conductor 14 to the line circuit coil L1 (Transformer Secondary). Transistor Q1 has its base coupled to OR gate 73 through resistor R1. The base is biased to negative voltage through resistor R2. Its emitter is shown tied to a negative voltage. Its collector is connected to conductor 14 through resistor R3.

As in a regular line to register connection, when the hook switch is off hook at line circuit 12, then an "off-hook" signal is given to AND gate 71. Of course, then a "not-busy" signal 76 is also provided to AND gate 71. The common control circuit 16 marks the line by sending the time slot and normal mark signals to the line.

The common control circuit 16 enables the register by sending the register time slot and mark matrix signals to the register 19 over conductors 23 and 83. At this time, the line circuit has already marked its end of the matrix when transistor Q1 switched to its conducting state and pulled its end of the matrix negative. The negative mark at the line side of the matrix is held to a fixed voltage through the use of diode D2 and zener Z1, which clamps the conductor 14 at the desired fixed voltage. The junction of diode D2 and zener Z1 is coupled to negative voltage through resistor R12.

The register marks its end of the matrix responsive to the signals on the register time slot conductor and at the mark matrix gates. The positive register time slot signal is transmitted through OR gate G2 and transmitted from the output of the gate G2 to the emitter of NPN transistor Q2 over resistor R4. The signal from gate G2 causes transistor Q2 to conduct. The base of transistor Q2 is tied to positive voltage through diode D3 and to ground through resistor R4. The collector of transistor Q2 is connected directly to marking means such as the base of PNP transistor Q3 through conductor 84. When the transistor Q2 is turned on, then transistor Q3 conducts, marking the register end of the matrix over conductor 21.

The emitter of transistor Q3 is tied to positive voltage through resistor R6. The collector of transistor Q3 is tied directly to conductor 21 so that the positive voltage through transistor Q3 marks the access to matrix 13. It should be noted that the transistor Q3 circuit is a constant current supply.

Switching control means are provided in the register. More particularly, an AND gate G3 operates responsive to the simultaneous receipt of the register time slot signal and a mark matrix gate signal from the common control circuit. Any time the gate G3 operates, it provides negative signals to PNP transistor Q4 in the matrix causing PNP transistor Q4 to switch to its conducting condition. More particularly, the signal from the AND gate G3 is coupled to the base of transistor Q4 in the matrix through conductor 86 and resistor R7. The negative signal from gate G3 turns on transistor Q4. The emitter of transistor Q4 is tied directly to ground. The collector of transistor Q4 is biased to negative voltage through resistor R8.

The transistor Q4 controls a switching element of the matrix. More particularly, the collector of transistor Q4 is also coupled to the gate of a silicon controlled rectifier SCR-1, which is a switching element of the matrix, through resistor R9 and diode D4. The junction of diode D4 and resistor R9 is coupled to a clamping circuit through diode D6 connected to the junction of resistor R11 and the cathode of zener diode Z2. The other side of the resistor R11 is tied to ground. The anode of zener diode Z2 is coupled to the junction of zener diode Z1 and resistor R12.

The gate of SCR-1 is thus clamped at a value positive with respect to the cathode of SCR-1 which is connected to the negatively marked conductor 14. Thus with the positive mark on conductor 21, the negative mark on conductor 14, the gate biased positive with respect to its cathode, the SCR-1 turns on, switching through path 32 between the register 19 and the line circuit 12. Holding means are provided. For example, a signal detector detects the completion of the path and provides a signal responsive thereto at the other input of Gate 2. The output of gate G2 maintains transistor Q2 and Q3 in the conducting state to retain the path through the matrix.

The trunk circuit 17 is now connected over to the line circuit 12 in the following manner. The common control circuit re-marks the line by sending an over-ride mark along with the time slot signal to AND gate 72. Therefore, the AND gate 72 provides a signal to OR gate 73 to once again switch transistor Q1 to the conducting condition. The negative voltage at the emitter of transistor Q1 is applied once again to line 14 and, therefore, the line circuit re-marks conductor 14. On a trunk circuit time slot, the common control marks the trunk by sending the trunk time slot and marked matrix signal to the trunk.

The trunk time slot signal from the common control is applied simultaneously to OR gate G6 and AND gate G7. The output of gate G6 is applied to NPN transistor Q5, causing the transistor to switch from the non-conducting state to the conducting state. More particularly, the emitter of transistor Q5 is connected to the output of gate G6 through resistor R10. The base of transistor Q5 is coupled to positive voltage through diode D7. The junction of the cathode of diode D7 and the base of transistor Q5 is coupled to ground through resistor R13. The collector of transistor Q5 is connected directly to the base on PNP transistor Q6.

The operation of transistor Q5 to the conducting condition causes transistor Q6 to also conduct. The emitter of transistor Q6 is connected to positive voltage through resistor R14. The collector of transistor Q6 is connected to the anode of a second silicon controlled rectifier used as a matrix switching device SCR-2. The connection of transistor Q6 to the anode of SCR-2 is over the conductor 18 shown in FIG. 1, and provides a positive mark and hold current to the output side of the switching matrix. Gate G7 in the trunk circuit is an AND gate and conducts when it receives the time slot gate signal and the mark matrix gate signal simultaneously.

The output of gate G7 is connected to PNP transistor Q7 in the matrix over conductor 87 and resistor R17. More particularly, it provides a negative signal to the base of PNP transistor Q7 and turns transistor Q7 to its conducting state. The emitter of transistor Q7 is connected directly to ground. The collector of transistor Q7 is connected from negative voltage through resistor R15. The collector of transistor Q7 is also connected to the gate of SCR-2 through resistor R16 and diode D8 causing SCR-2 to conduct. The gate of SCR-2 is clamped through diode D9 connected to the junction of zener diode Z2 and resistor R11. The gate of SCR-2 is also connected to the cathode of SCR-2 through resistor R26 just as the cathode and gate of SCR-1 are coupled through resistor R27.

Means are provided for properly biasing the transistors in the matrix. For example, the bases of transistors Q4 and Q7 are connected to negative voltage through resistors R19 and R21, respectively. Similarly, conductors 86 and 87 have a positive bias applied to them through resistors R18 and R22, respectively.

The switching through and the maintenance of the path from the trunk to the line circuit occur in the same manner as previously described for the register to line path. Thus, for example, transistor Q6 serves as a constant current source.

Thus, while the register is still connected to the line circuit through the switching matrix, the trunk is also connected to the line circuit through the switching matrix.

Responsive to signals from the common control circuit 16, both the register and the trunk circuits are simultaneously connected through the switching matrix to line circuit 12, avoiding the necessity of separate access circuits and/or separate digit collectors. The trunk and transfer link of FIG. 2 are simultaneously connected to the line circuit through the matrix in a manner similar to the description of the connection of the trunk and register of FIG. 1 as described in conjunction with FIG. 3. Thus, when reading the description of the hardware of FIG. 3, if the register and trunk were replaced by a trunk and transfer link, the connections would be accomplished as described with minor differences of sequence and the like. The connection 54 of FIG. 2 to the matrix 43 is handled as a single connection in a manner known to those skilled in the art. The dual paths, shown in FIG. 2 avoid the necessity of excess access circuits and assure a more efficient sharing of transfer circuits.

The advantages of the muliple connections to the line circuit through the matrix will be apparent to those skilled in the art. Chief among those advantages is the savings on the individual equipment and more efficient use of the remaining individual equipment provided for attachment to the switching matrix to effect communication circuits between calling parties and the called parties. Further, while the features and advantages are described herein relative to PABX systems, they are also applicable to central office systems; and while the examples described relate to toll restriction and transfer circuits, the advantages of the multiple connection techniques apply in a similar manner to other features and circuits.

While the principles of the invention have been described above in connection with specific apparatus and applications, it is understood that this description is made only by way of example and not as a limitation on the scope of the invention.

What is claimed is:

1. A telephone system having the facilities to connect line circuits through switching matrices to selected other line circuits comprising:
    switching matrix means;
    means coupling a plurality of said line circuits to the input of said switching matrix means, each of the line circuits of said plurality of line circuits having a single appearance point on said switching matrix means;
    function circuit means at the output of said switching matrix for effecting the connection of calling ones of said line circuits to called ones of said line circuits;
    common control means connected to each of the plurality of line circuits and to the function circuit means for detecting the status of the line circuits and the status of the function circuit means;
    said common control means operated responsive to one of said line circuits in a certain condition for causing said one of said line circuits to mark the appearance of the one of said line circuits at the input of said switching matrix means, and for causing one of the function circuit means to mark an output of said switching matrix means;
    means responsive to the mark at the input and the mark at the output for completing a first path through the switching matrix means from the one of said line circuits to said one of said function circuit means;
    means responsive to re-mark signals from said common control circuit to said line circuit for causing said one of said line circuits to re-mark the appearance of said particular line circuit at the input of said matrix means;
    means responsive to function circuit means control signals from said common control means for causing a second function circuit to mark another output of said switching matrix means;
    means responsive to said re-mark by said one of said line circuits and the mark at said another output for completing a second path through said switching matrix means from said line circuit to said second function circuit means, and
    means for simultaneously holding said first and second paths through said switching matrix means, whereby simultaneous multiple connections are held to the particular line circuit through the matrix means.

2. A telephone system used for connecting line circuits to other line circuits comprising:
    a plurality of line circuits;
    switching matrix means;
    means for connecting said line circuits to said switching matrix means to provide one appearance for each of said line circuits at said switching matrix means;
    function circuits at the output of said switching matrix means;
    said function circuits used to complete calls from calling ones of said line circuits to called ones of said line circuits and to distant line circuits;
    said function circuits comprising trunks, registers, and links;
    means for coupling said function circuits to the output side of said switching matrix means;
    means connecting a desired one of said line circuits through said switching matrix means to more than one of said function circuits; and
    means for simultaneously holding the connections between the desired one of said line circuits and the more than one of said function circuits.

3. The telephone system of claim 2 wherein, said function circuits simultaneously connected through the matrix means to said desired one of said line circuits comprise a trunk circuit and a register circuit.

4. The telephone system of claim 2 wherein, the function circuits simultaneously connected through said switching matrix means to said desired one of said line circuits comprise a trunk circuit and a transfer link.

5. The telephone system of claim 2 wherein, said switching matrix means comprises a plurality of electronic switching means;
    said system further comprising:
    means at said desired ones of said line circuits for marking the input end of said switching matrix means;
    means at a first of said function circuits for marking an appearance at the output end of said switching matrix means;
    means in said switching matrix means operated responsive to the marking of said input end and said output end for causing one of said plurality of electronic switching means to switch from a non-conducting state to a conducting state to thereby switch a path from said first function circuit to said line circuit;
    means at said line circuit for re-marking said input side of said switching matrix means;
    means at a second of said function circuits for marking the appearance of said second of said function circuits at the output side of said switching matrix means; and
    means in said switching matrix means operated responsive to the marking of said input end and said output end causing another of said plurality of electronic switching means to switch from a nonconducting state to a conducting state to thereby switch a path through said switching matrix means from said second function circuit to said line circuit.

6. The telephone system of claim 5 wherein, common control means are provided coupled to said line circuits and said function circuits for controlling the path connections;

means are provided in said desired line circuit for marking the appearance of said desired one of said line circuits at the input side of said switching matrix means responsive to the simultaneous occurrence of an "off-hook" condition, a "not-busy" condition, a receipt of a mark signal and an individual time slot signal from said common control means; and means are provided in said desired one of said line circuits for re-marking said appearance of said desired one of said line circuits at the input of said switching matrix means responsive to said line circuit being in the "off-hook" condition and receiving a time slot signal and an over-ride signal from said common control means.

7. The telephone system of claim 6 wherein, the means for marking the appearance of said function circuits at the output side of said switching matrix means includes constant current generator means.

8. The telephone system of claim 7 wherein, said first of said function circuits comprises gate means operated responsive to a first function circuit time slot signal and a mark signal being received simultaneously from said common control means; and said second of said function circuits comprises gate means operated responsive to the receipt of the second function time slot signal and a mark signal received simultaneously from said common control means.

9. The telephone system of claim 8 wherein, means are provided for clamping the mark at the appearance of the desired one of said line circuits at the input side of the switching matrix means to thereby limit the voltage excursion of the mark and assure that a sufficient signal differential appears across the said one of said plurality of switching means to switch the said one of said plurality of switching means, responsive to the mark on the input side and the mark on the output side of the switching matrix means.

10. The telephone system of claim 9 wherein, said plurality of switching means comprises silicon control rectifiers.

11. The telephone system of claim 10 wherein, said line circuits include a first AND gate;

said first AND gate operated by the simultaneous receipt of an "off-hook" signal, a "not-busy" signal, a mark signal, and a time slot signal;

a second AND gate, said second AND gate operated responsive to an "off-hook" signal, a time slot signal and a re-mark signal;

an OR gate;

means for coupling said first and second AND gates to the inputs of said OR gate;

means responsive to a signal from either said first or second AND gate for operating said OR gate;

first transistor means in said line circuits operated from a non-conducting state to a conducting state responsive to the operation of the OR gate means;

said first transistor means providing a negative mark through the conductor coupled to the appearance of said line circuits at the input side of said matrix means;

said negative mark being coupled to the appearance through first resistor means.

12. The telephone system of claim 11 wherein, said clamping means comprises a diode coupled through a zener diode to ground, the anodes of said diode and zener diode being joined to form a junction, the junction being coupled to negative voltage through second resistor means, said second resistor means in said line circuit being of a value to enable the clamping.

13. The telephone system of claim 11 wherein, said marking means of said first and second function circuits include an OR gate, time slot signal means connected to one input of the OR gate, function transistor means operated responsive to the signal from said OR gate for providing positive marks to the appearances of said function circuits at said output side of said switching matrix means, second gate means opeated responsive to simultaneous receipt of said time slot signal and a mark matrix signal, the system further including:

matrix transistor means in said switching matrix means operated to its conducting condition responsive to the output signal from said second gate means, the output of said matrix transistor means coupled to the gate of the silicon controlled rectifier which is marked by the operation of the function circuit and by the line circuit, means responsive to said matrix transistor means operated to a conducting state for placing a signal on the gate of said marked silicon controlled rectifier which is more positive than the signal at the cathode of said marked silicon controlled rectifier, and means for coupling the anode of said marked silicon controlled rectifier to the appearance of the function circuit at the output side of the switching matrix means, thereby enabling the switching of said marked silicon controlled rectifier.

14. An improved telephone switching system comprising:

switching matrix means;

a plurality of line circuits each connected with one appearance at the input side of said switching matrix means;

function circuits each connected with one appearance at the output side of the switching matrix means for providing necessary functions to complete a path from the line circuits to central office line circuits or to other line circuits;

common control means coupled to both said line circuits and said function circuits for monitoring the condition of said line circuits and said function circuits and for providing timing signals and operating signals to said line circuits and said function circuits;

means responive to signals from said common control means for causing one of said function circuits and one of said line circuits to place a mark at opposite ends of said switching matrix means, thereby to cause a path to switch through the switching matrix means and connect said one of said line circuits and said one of said function circuits through said switching matrix means, the improvement characterized in that means are provided for causing said one of said line circuits to re-mark the appearance of the said one of said line circuits at the input side of the matrix means responsive to signals from the common control means and for causing a second of said function circuits to mark the appearance of the second function circuit at the output of said line circuit to thereby switch through a second path from said function circuit to said one of said line circuits simultaneously with the maintenance of the first path through said switching matrix means.

15. The improved telephone system of claim 14, characterized in that said switching matrix means comprises silicon controlled rectifier switching elements, and wherein clamping means are provided for the marking signal at the line side of the switching matrix means and constant current generator means are provided at the function circuit side of the switching matrix means.

* * * * *